US009873562B2

(12) United States Patent
Marsolais

(10) Patent No.: US 9,873,562 B2
(45) Date of Patent: Jan. 23, 2018

(54) WATER TANK LIFTING HARNESS AND DRAIN PAN SYSTEM

(71) Applicant: Eric Marsolais, Pointe-Claire (CA)

(72) Inventor: Eric Marsolais, Pointe-Claire (CA)

( * ) Notice: Subject to any disclaimer, the term of this patent is extended or adjusted under 35 U.S.C. 154(b) by 139 days.

(21) Appl. No.: 15/061,060

(22) Filed: Mar. 4, 2016

(65) Prior Publication Data

US 2017/0225894 A1   Aug. 10, 2017

(30) Foreign Application Priority Data

Feb. 8, 2016   (CA) ...................................... 2920128

(51) Int. Cl.
*B65G 7/12* (2006.01)
*A45F 3/14* (2006.01)

(52) U.S. Cl.
CPC .................. *B65G 7/12* (2013.01); *A45F 3/14* (2013.01); *A45F 2003/142* (2013.01)

(58) Field of Classification Search
CPC ........ A45F 3/14; A45F 3/15; A45F 2003/142; A45F 2003/144; A45F 2003/146; A45F 2003/148; B65G 7/12
USPC .......................................................... 224/157
See application file for complete search history.

(56) References Cited

U.S. PATENT DOCUMENTS

| 170,599 | A | * | 11/1875 | Small | B65G 7/12 294/15 |
| 2,431,780 | A | * | 12/1947 | Theal | A45F 3/14 224/157 |
| 4,099,656 | A | * | 7/1978 | Neumann | A45C 3/00 294/157 |
| 5,503,448 | A | * | 4/1996 | Dewey | A45C 13/38 294/152 |
| 6,276,732 | B1 | * | 8/2001 | Hauss | B65G 7/12 294/118 |
| 6,508,389 | B1 | * | 1/2003 | Ripoyla | A45F 3/14 182/3 |
| 7,077,447 | B1 | * | 7/2006 | Betway | B65G 7/12 294/152 |
| 8,313,130 | B2 | * | 11/2012 | Hazel | E03D 11/135 294/144 |
| 8,807,403 | B2 | * | 8/2014 | Nielsen | A45F 3/14 224/157 |
| 2005/0103813 | A1 | * | 5/2005 | Edwards | B65G 7/12 224/157 |
| 2006/0017299 | A1 | * | 1/2006 | Halvorsen, Jr. | B65G 7/12 294/152 |
| 2006/0055192 | A1 | * | 3/2006 | Hirsch | A45F 3/04 294/157 |
| 2007/0131726 | A1 | * | 6/2007 | Aliev | A45F 3/14 224/184 |
| 2009/0014483 | A1 | * | 1/2009 | Green | A41D 13/0007 224/157 |

FOREIGN PATENT DOCUMENTS

DE           10342412 A1 *   4/2005   ............... A45F 5/10

* cited by examiner

*Primary Examiner* — Joshua E Rodden

(57) ABSTRACT

The present invention relates to a system to facilitate the moving of a water tank by two persons while also containing leaks and more particularly to a waterproof flexible drain pan held inside a pair of crossed adjustable harnesses and lifting straps. The drain pan has an integrated hose connector.

4 Claims, 2 Drawing Sheets

WATER TANK LIFTING HARNESS AND DRAIN PAN SYSTEM

TECHNICAL FIELD

The present invention relates to a system to facilitate the moving of a water tank in an upright position by two persons while also containing leaks and more particularly to a waterproof flexible drain pan affixed atop a pair of crossed independently adjustable lifting harnesses. The drain pan has an integrated hose connector.

BACKGROUND OF THE INVENTION

Over time, the interior of a water tank will have accumulated sediment. Even after draining, a water tank will still have some water and sediment in it.

Water tanks eventually leak. A leaking water tank needs to be removed from inside a dwelling. While moving a leaking tank, some of the remaining water and sediment can drip out, especially if the tank is tilted. This water and sediment may stain floor coverings, such as carpets.

Water tanks are heavy, so consideration should be given to avoid physical injury while moving them. The assistance of another person is recommended.

The components of a water tank are fragile and susceptible to damage from vibration while in motion. When a water tank is placed in a horizontal position, the interior glass lining, anodes and dip tubes can be stressed and break while the outside plumbing and casing can be crushed or dented. Manufacturers recommend keeping a new water tank in an upright position during transport.

You can use an appliance dolly to move a water tank but need to cushion it to lessen the transfer of vibrations and bumps. The wheels of the appliance dolly risk marking or scratching floors. The appliance dolly works fairly well for moving a water tank along a smooth floor, but is less practical over rough surfaces or over stairs, especially stairs that have sharp turns.

Prior art of movers straps, such as CA 2568418 are not designed to hold a cylinder, such as a water tank, in an upright position nor contain leaks from a leaking water tank.

Prior art of a lifting harness FR 3014090 does not allow for adjusting the lifting straps nor is it designed to contain leaks both during transport and while at rest. The same can be said for loading slings U.S. Pat. No. 2,440,712 and U.S. Pat. No. 1,365,511.

Prior art of collector/drain pans for hot water tanks such as CA 2110466 and CA 2187824 are not designed for transporting a water tank nor do they have flexible sides to allow for the water tank to be rolled onto them.

The improved apparatus of the present invention comprises a pair of independently adjustable lifting harnesses forming a cross pattern on top of which a flexible waterproof drain pan is affixed. The flexible drain pan allows for a water tank to be rolled onto it. The combination of the crossed harnesses and the flexible drain pan forms a cradle that holds the water tank in an upright position for transport by two persons while the flexible waterproof drain pan contains water dripping from a leaking water tank. The independently adjustable lifting harnesses make it possible to maintain the water tank upright during transport, even in stairs.

SUMMARY OF THE INVENTION

The invention described and claimed herein comprises two independently adjustable harnesses forming a cross section atop of which a flexible drain pan is affixed. The combination of the harnesses and flexible drain pan is placed on the floor near the upright water tank to be moved. Tilting the upright water tank slightly, it is rolled and centered onto the flexible drain pan allowing the side of the drain pan to regain its vertical shape. Adjusting the length of the harnesses to suit their needs, the two persons, standing upright, have their arms and hands free to steady the water tank and maneuver safely around. The persons can hold onto railings while going up or down stairs, while maintaining an upright, ergonomically correct stance, enabling safe lifting with less risk of back strain and injury.

Among the objects of the present invention are the following:

to provide new and useful lifting harness and drain pan combination for transporting a water tank in an upright position;

to provide new and useful lifting harness and drain pan combination having a pair of independently adjustable harnesses forming a cross section on top of which a flexible drain pan is affixed;

to provide new and useful lifting harness and waterproof drain pan combination for containing leaks while moving a water tank;

to provide new and useful flexible drain pan allowing a water tank to be rolled over its sides in a mostly upright position and having the sides of the flexible drain pan regain their vertical shape once the drain pan is centered onto the drain pan;

to provide a threaded hose connector on the side of the flexible drain pan that can either be plugged during transport or connected to a hose while the flexible drain pan is placed under a stationary water tank;

to provide a flexible drain pan capable of receiving a leak detection device such as ones manufactured by D-Link (D-Link Water Sensor) or Honeywell (Honeywell Water Defense Water Sensing Alarm) or similar, with the sensor positioned in the space between the water tank and the vertical edges of the flexible drain pan.

These and other objects and advantages of the invention, as well as the details of an illustrative embodiment, will be more fully understood from the following drawings and specification, in which:

1—A pair of independently adjustable lifting harnesses.

2—A pair of buckles to adjust independently the length of the lifting harnesses.

3—Flexible, waterproof drain pan, affixed on top of the cross section of the lifting harnesses.

4—Integrated hose connector with plug.

Figure 2:
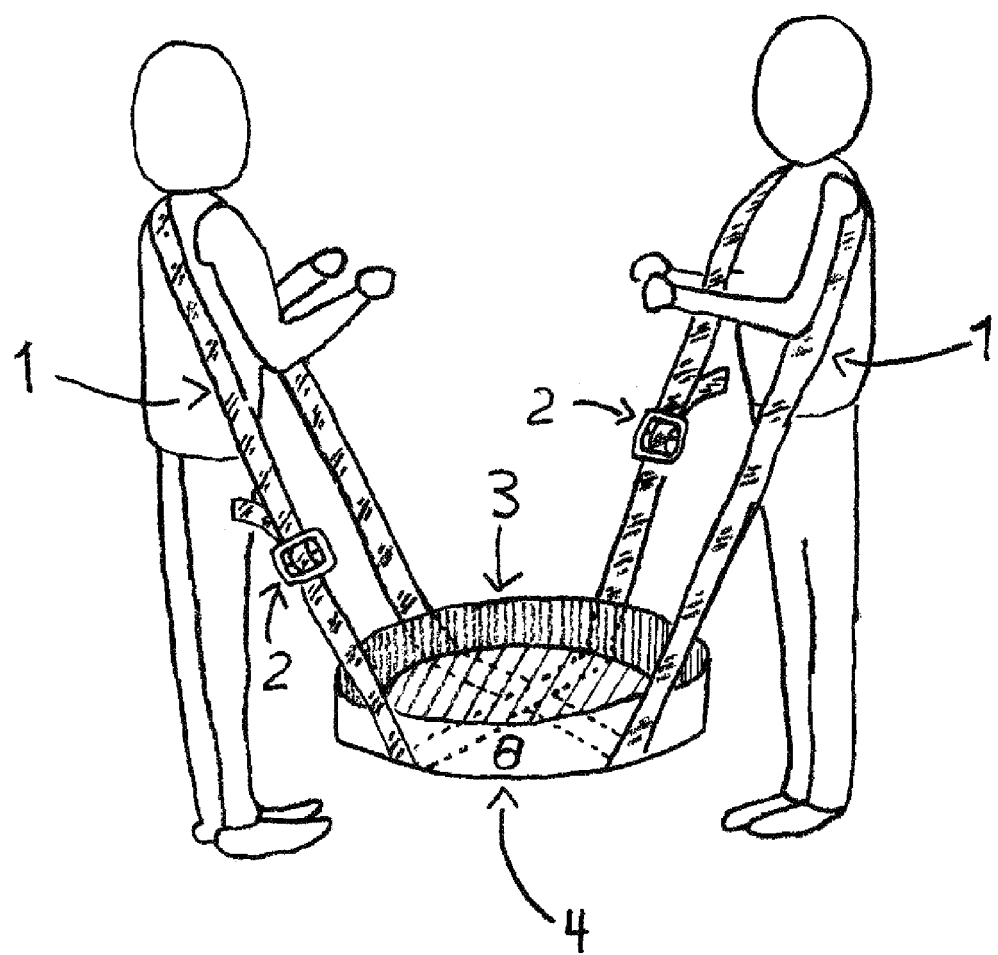

FIG. 2 A perspective view of the apparatus of the present invention in a use environment.

1—A pair of independently adjustable lifting harnesses, each person placing one harness each on one shoulder and crossing it over their back, leaving their arms free.

2—A pair of buckles to adjust independently the length of the lifting harnesses.

3—Flexible, waterproof drain pan, affixed on top of the cross section of the lifting harnesses.

4—Integrated hose connector with plug.

DETAILED DESCRIPTION

Figure 1:
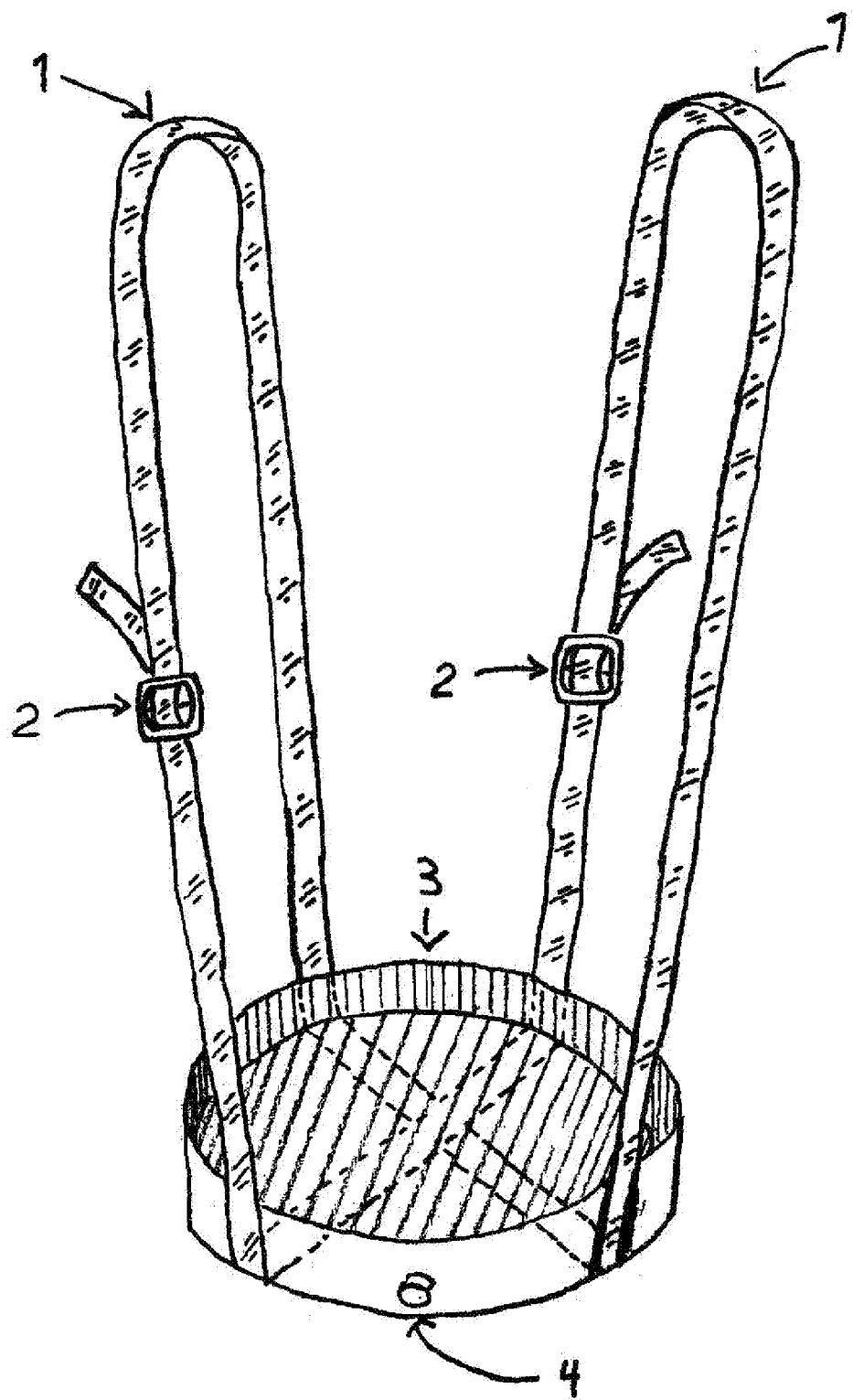
FIG. 1 A perspective view of the apparatus of the present invention.

Referring to FIG. 1, two identical lifting harnesses 1 are provided and form a cross section. Buckles 2 are provided on one side of each lifting harnesses. The flexible drain pan 3 is affixed on top of the cross section formed by the identical lifting harnesses 1. The threaded hose connector 4 is affixed to the side of the flexible drain pan.

A water tank is relatively heavy and awkward to carry in a vertical position. With the lifting harnesses 1 and drain pan 3 combinations placed under a water tank standing upright, the weight of the water tank itself helps to stabilize the load between to two persons.

One lifting harness is placed on one shoulder of each person and crossed over their back, leaving their arms free.

Referring to FIG. 2, the hands of the persons are free to enhance the stability of the water tank being carried as well as to help the persons steady themselves while going up or down stairs by holding onto railings.

The effective lengths of the lifting harnesses can be independently adjusted using the buckles 2.

While the principles of the invention have been made clear in illustrative embodiments, the appended claims are intended to cover and embrace modifications, within the limits of the true spirit and scope of the invention.

What is claimed:

1. A lifting device for the movement of a water tank in an upright position by two persons which comprises:
    a) A pair of independently adjustable harnesses;
    b) Each harnesses having a buckle to adjust a length of the harness;
    c) One of said buckle located on one side of a loop formed by each harness;
    d) Whereby each person can adjust the length of their respective harness independently of the other person;
    e) The two harnesses form a crossed pattern section;
    f) A flexible waterproof drain pan affixed on top of the crossed pattern section of the adjustable harnesses;
    g) Whereby the drain pan is affixed on top of the crossed pattern section of the adjustable harnesses so as not to interfere with the drain pan's waterproof characteristic; and
    h) Whereby the drain pan includes a flexible side wall to allow the upright water tank to be rolled onto it, with the sidewall of the drain pan resuming its vertical shape once the water tank is centered in the drain pan.

2. The lifting device according to claim 1 wherein the drain pan further comprises a threaded hose connector incorporated onto its side wall.

3. A method of lifting and moving a water tank in an upright position with the device of claim 1 or 2, the method comprising the steps of:
    a) Positioning the device on a ground beside the upright water tank to be moved;
    b) Tilting the upright water tank, rolling it over the wall of the flexible drain pan and centering the water tank over the drain pan, allowing the wall of the drain pan to regain its vertical position;
    c) Each user adjusts the length of their respective harness, independently of the other to compensate for their height difference and whether or not they will be carrying the water tank over stairs; and
    d) Lifting and moving the water tank by means of the device.

4. A method of containing leaks from a water tank both while it is stationary and in transport, the method consisting of:
    a) Positioning the device of claim 2 under a water tank;
    b) Connecting a hose to the threaded hose connector of the flexible drain pan;
    c) Directing the other end of the hose towards a floor drain;
    d) Permitting water leaking from the water tank to empty into the floor drain;
    e) Plugging the threaded hose connector; and
    f) Lifting and moving the upright water tank by means of the device while containing the water inside the flexible drain pan.

* * * * *